United States Patent [19]
Jacob et al.

[11] Patent Number: 5,309,266
[45] Date of Patent: May 3, 1994

[54] PHOTONIC SWITCHING MATRIX

[75] Inventors: Jean-Baptiste Jacob, Perros-Guirec; Guy Le Roy, Lannion; Jean-Michel Gabriagues, Le Val Saint-Germain, all of France

[73] Assignee: Societe Anonyme dite: Alcatel Cit, Paris, France

[21] Appl. No.: 827,168

[22] Filed: Jan. 28, 1992

[30] Foreign Application Priority Data

Jan. 29, 1991 [FR] France .................. 91 00978

[51] Int. Cl.$^5$ .................................. H04B 10/20
[52] U.S. Cl. ................................ 359/139; 359/117
[58] Field of Search ............ 359/117, 123, 128, 139; 370/60

[56] References Cited

U.S. PATENT DOCUMENTS 5,005,166  4/1991  Suzuki ......................... 359/117

FOREIGN PATENT DOCUMENTS 0351729  1/1990  European Pat. Off. ..... H04Q 11/00

Primary Examiner—Leslie Pascal
Attorney, Agent, or Firm—Sughrue, Mion, Zinn, Macpeak & Seas

[57] ABSTRACT

A photonic switching matrix comprises a plurality of wavelength converters at respective inputs of the matrix to assign a wavelength to each cell applied to an input of the matrix. An optical buffer common to all the outputs of the matrix stores each cell for a duration selectable between 0 and $k.T_c$ where k is an integer and $T_c$ is the duration of cell. A space routing stage comprises a filter for each output of the matrix passing to a given output only cells having a given wavelength. The converters and the buffer are controlled according to routing information indicating for each cell the output of the matrix to which said cell is addressed and for selecting the duration for which each cell is stored in the buffer so as to construct a queue for each output to avoid conflicts between two cells to be switched to the same output presented at the same time as the input of the switching matrix. The switching matrix has applications in telecommunication networks.

3 Claims, 2 Drawing Sheets

PHOTONIC SWITCHING MATRIX

BACKGROUND OF THE INVENTION

1. Field of the Invention

The invention concerns a photonic switching matrix for implementing a multistage switching network. It provides for point-to-point and point-to-multipoint connections for switching data in the form of fixed length cells asynchronously time-division multiplexed onto optical fibers.

2. Description of the prior art

The article: ATM photonic switching network, reference 14B2 of TOPICAL MEETING ON PHOTONIC SWITCHING, KOBE, JAPAN, Apr. 12-14, 1990 describes a photonic switching matrix comprising:

an input interface module at each of the n inputs of the matrix for identifying the cells arriving at said input by reading a virtual channel label or virtual circuit group label included in the header of the cell and to convert the wavelength of each cell into a wavelength representing one output of the matrix;

cell selectors each comprising a splitter and filters for distributing the cells to the outputs of the matrix according to their wavelengths; and an optical buffer for each output for storing cells addressed to the same output and which may be in conflict for access to that output.

A disadvantage of this known type of switching matrix is that it requires an optical buffer for each matrix output. Each of these buffers comprises:

n optical memories having a capacity equal to one cell and which can be in the form of an optical delay line; and an n×m spectral division switch.

This n×m switch comprises wavelength converters for converting the wavelength of each cell, cell by cell, a combiner, a splitter and filters which can be tuned to route each cell into one of the optical memories. The optical memories being connected in series, they provide for introducing a time-delay between 0 and m times the duration of a cell.

A disadvantage of this known type matrix is that it requires a buffer for each matrix output which increases the number of components and therefore the manufacturing cost.

An object of the invention is to propose a simpler photonic switching matrix that is less costly than this known type matrix but which enables a multistage switching network to be implemented by combining a plurality of matrices in accordance with the invention and which caters for both point-to-multipoint connections and point-to-point connections.

SUMMARY OF THE INVENTION

The invention consists in a photonic switching matrix having n inputs and n outputs for switching data in the form of fixed length cells asynchronously time-division multiplexed onto optical fibers comprising:

a plurality of wavelength converters at respective inputs of the matrix to assign a wavelength to each cell applied to an input of the matrix;

an optical buffer common to all the outputs of the matrix for storing each cell for a duration selectable between 0 and $k.T_c$ where k is an integer and $T_c$ is the duration of a cell;

a space routing stage comprising a filter for each output of the matrix passing to a given output only cells having a given wavelength; and control means for controlling the converters and the buffer according to routing information indicating for each cell the output of the matrix to which said cell is addressed and for selecting the duration for which each cell is stored in the buffer so as to construct a queue for each output to avoid conflicts between two cells to be switched to the same output;

wherein said buffer comprises:

(k+1) delay lines respectively introducing time-delays $0, \ldots, k.T_c$ and having outputs connected to inputs of the space routing stage;

(k+1) combiners each having an output connected to an input of a delay line and n inputs;

n splitters each having an input constituting an input of the buffer and (k+1) outputs; and (k+1).n optical gates each connecting an output of one of the n splitters to an input of one of the (k+1) combiners and controlled by the control means so that each splitter is connected to a single combiner at a time.

This switching matrix comprises only one buffer for storing all the cells irrespective of the output to which they are addressed. It is therefore simpler and less costly than the known type switching matrix.

The invention will be better understood and other features of the invention will emerge from the following description and the accompanying drawings.

DETAILED DESCRIPTION OF THE INVENTION

Figure 1:
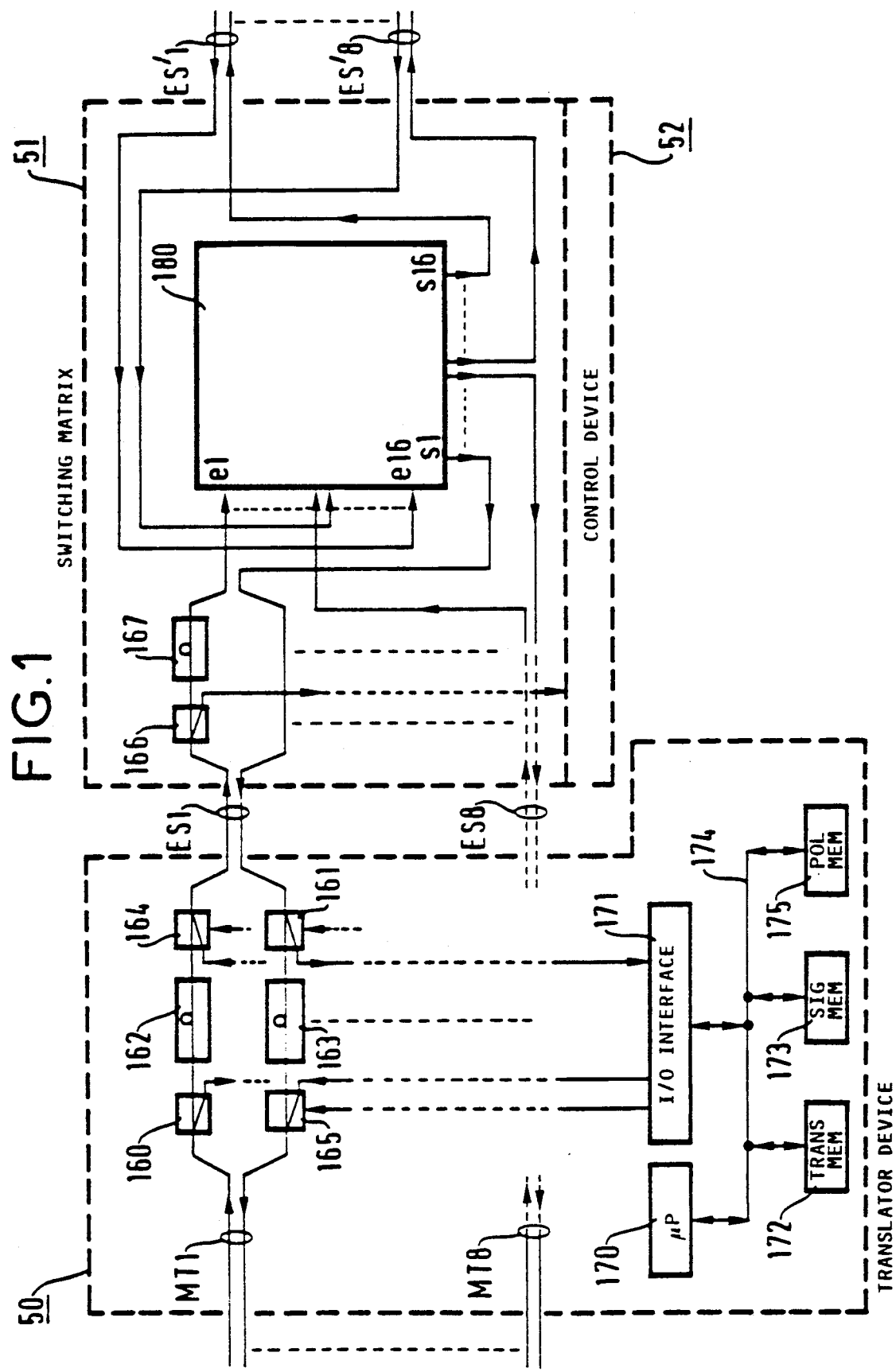
FIG. 1 shows the block diagram of one part of a switching network comprising a plurality of switching matrices in accordance with the invention.

FIG. 1 shows, by way of example, part of a first stage of a switching network which might comprise three stages, for example. The part shown comprises a device 50 at the input of the switching network and connected to asynchronous time-division multiplexes MT1, ..., MT8, a switching matrix 51 connected by input-output multiplexes ES1, ..., ES8 to the device 50 and by input-output multiplexes ES'1, ..., ES'8 to another stage (not shown) of the switching network and a control device 52 associated with the matrix 51.

In practice the matrix 51 comprises a matrix 180 having 16 inputs for the matrix rows and 16 outputs for the matrix columns. Each input-output ES1, ..., ES8 of the matrix 51 is therefore made up of a separate input and output respectively connected to one of the 16 inputs e1, ..., e16 of the matrix 180 and to one of the 16 outputs s1, ..., s16 of the matrix 180.

The matrix 51 further comprises 16 three-port couplers and 16 delay lines enabling four routing bits to be sampled in each cell and supplied to the control device 52. For example, the input-output ES1 is connected to the input e1 of the matrix 180 by a coupler 166 in series with a delay line 167 which introduces a time-delay equal to the processing time required for the device 52 to interpret the routing bits. The input-output ES1 is also connected directly to the output s1 of the matrix 180. One port of the coupler 166 is connected to an input of the control device 52 whose block diagram will be described later.

The device 50 comprises eight pairs of three-port couplers such as the couplers 160, 161, eight pairs of delay lines such as the delay lines 162, 163 and eight pairs of three-port couplers with an electrical control input such as the couplers 164, 165. Each bidirectional multiplex MT1, ..., MT8 is carried in the device 50 by two unidirectional channels with the result that the components of this device are duplicated.

The device 50 further comprises:
a microprocessor 170;
an input-output interface 171;
a translation memory 172;
a signalling memory 173;
a policing memory 175; and
a bus 174 interconnecting all the above components.

The cells arriving from subscriber terminals via a concentrator pass in succession through the coupler 160, the delay line 162 and the coupler 164. The coupler 160 is a passive coupler whose third port is connected to an input of the interface 171 to send to the latter the five header bytes of each cell. The delay line 162 introduces a time-delay equal to the time required for the microprocessor 170 to process this header.

The microprocessor 170 checks this header by recalculating the error detection word and comparing it with that contained in the header, translates the virtual circuit label or virtual circuit group label by consulting the memory 172 which supplies a new label value, adds a routing label to the existing header, calculates a new error detection word to allow for the new virtual circuit or virtual circuit group label and implements the conventional policing function. The coupler 164 is an active coupler for inserting a new header into the cell preceded by three routing label bytes. To this end the coupler 164 has a third port connected to an optical output of the interface 171 and an electrical control input connected to an output of the interface 171 supplying an electrical enabling signal. The coupler 164 is also used to send signalling or maintenance cells instead of empty cells.

The signalling memory 173 stores signalling cells incoming from or outgoing to the switching network 51, for example signalling cells to or from a control system of the telecommunication network.

Figure 2:
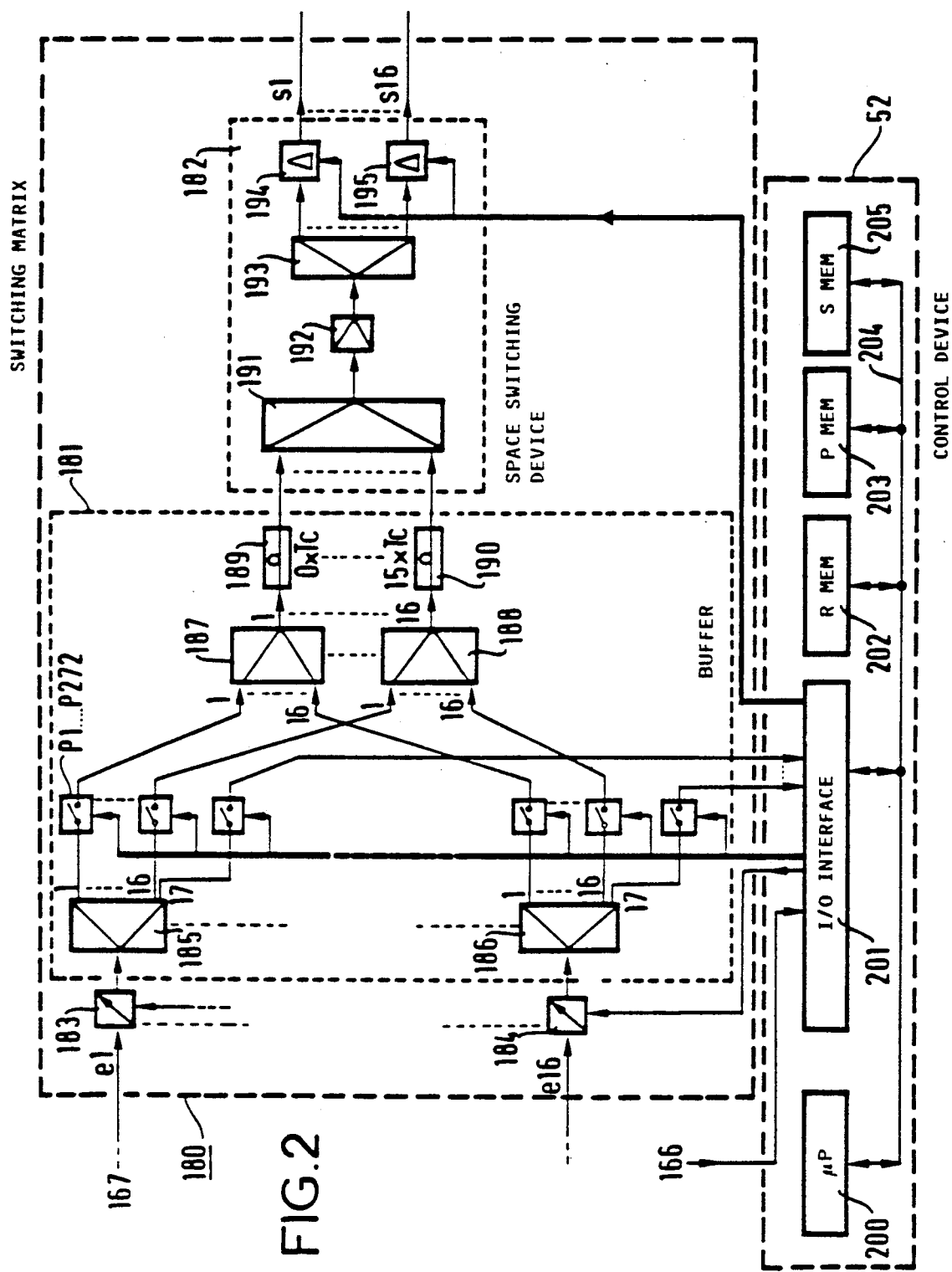
FIG. 2 shows the block diagram of one of the switching matrices that this switching network comprises.

FIG. 2 shows a more detailed block diagram of the switching matrix 180 and the associated control device 52. The device 52 comprises a microprocessor 200, an input-output interface 201, a routing memory 202, a pointer memory 203, a signalling memory 205 and a bus 204 interconnecting all these components.

The switching matrix 180 comprises 16 wavelength converters 183, ..., 184, a buffer 181 and a space switching device 182. The converters 183, ..., 184 have 16 inputs respectively connected to the 16 inputs e1, ..., e16 of the matrix 180, 16 outputs respectively connected to the 16 inputs of the buffer 181 and 16 electrical control inputs respectively connected to outputs of the interface 201 of the control device 52.

The device 182 executes space switching to transfer each cell received on one of the 16 inputs e1, ..., e16 of the matrix 180 to one of the 16 outputs s1, ... s16 of the matrix 180.

The function of the buffer 181 is to delay the cells before they are transferred into the device 182 as a means of resolving contention problems, that is to say conflict between two cells arriving simultaneously and addressed to the same output of the matrix 180. It must be possible to delay in 16 FIFO type queues cells addressed to any of the 16 outputs s1, ..., s16. In the switching matrix 180 the cells can be assigned 16 different colors by the converters 183 through 184 and the cell color provides a means of distinguishing between 16 queues respectively associated with 16 outputs, while storing the cells in a set of delay lines common to all these outputs. These queues are managed by the microprocessor 200 using pointers stored in the pointer memory 203.

The value of each pointer is between 0 and $k-1$ where k is the number of delay lines in the buffer 181. In this example $k=16$. The next cell to store in a given queue will be written into the delay line of rank $q+1$ if the pointer of this queue is equal to q and if q is less than $k-1$. If $q=k-1$ the queue is full and this cell will be lost because it cannot be written into the buffer 181.

The converters 183, ..., 184 are electrically controlled by the microprocessor 200 via the interface 201 on the basis of four bits which the device 52 extracts from the routing label indicating the number of the output to which the cell is addressed. The color assigned to the cell represents this output of the matrix 180.

The routing memory 202 stores:
control parameters of the converters 183, ..., 184 to assign a color to each cell according to the output to which it is addressed; and
an indicator for each cell showing whether the latter is part of a point-to-point connection or a point-to-multipoint connection, in which latter case the routing memory 202 supplies parameters for tuning a plurality of filters at the output of the device 182.

The buffer 181 comprise 16 splitters 185, ..., 186, 272 optical gates P1, ..., P272, 16 combiners 187, ..., 188 and 16 delay lines 189, ..., 190 introducing delays respectively equal to 0, Tc, 2.Tc, 3.Tc, ... 15.Tc where Tc is the cell period. These delay lines can delay any cell by an amount between 0 and 15.Tc independently of the cell color. The splitters 185, ..., 186 each have an input constituting a respective one of the 16 inputs of the buffer 181 and 17 outputs respectively connected to one of the 272 optical gates P1, ..., P272.

Of the 17 outputs of each splitter, 16 are connected by these gates to a respective input of one of the 16 combiners 187, ..., 188 and the seventeenth output is connected by a gate to one input of the input-output interface 201 of the control device 52. This input of the interface 201 is provided with an optical-electronic converter device (not shown) and enables the microprocessor 200 to receive the content of the signalling cells. Each input of each of the combiners 187, ..., 188 is therefore connected by one of the gates P1, ..., P272 to an output of one of the splitters 185, ..., 186. Thus any cell arriving at any one of the 16 inputs of the matrix 180 can be passed through any one of the 16 combiners 187, ..., 188 by opening one of the gates P1, ..., P272 which are controlled independently of each other by the microprocessor 200 via the interface 201.

Each combiner 187, ..., 188 has an output connected to one of the delay lines 189, ..., 190. The control device 52 therefore decides to delay by an amount between 0 and 15.Tc each of the cells arriving on one of the 16 inputs of the matrix 180 according to pointers contained in the memory 203 enabling the flow of cells addressed to each of the 16 outputs to be monitored and the time-delay assigned to each cell to be determined.

The buffer 181 behaves like 16 FIFO queues for the 16 outputs of the memory 180.

The number of cells that can be stored in each queue is set by the number k of delay lines 189, ..., 190. In this example this number is 16. The article "Buffer Sizing in an ATM Switch for both ATM and STM traffics", International Journal of Digital and Analog Cabled Systems, vol 2, 247-252 (1989) shows that an output buffer having a capacity of 16 cells for each output makes it possible to achieve a cell loss rate equal to $10^{-10}$. It is possible to obtain a given loss figure by choosing the number of delay lines 189, ..., 190.

In this embodiment the matrices of the switching network also change the order of the cells addressed to a concentrator, their original order being indicated by two routing bits. To re-establish their original order, the cells must be read in this order inside the buffer 181. The queue of each output multiplex is managed by the microprocessor 200, the routing memory 202 and the pointer memory 203 like four independent "sub-queues" respectively adapted to store the cells ranked 1, 2, 3, 4.

Consider the queuing of four cells which are to be sent in the order C1, C2, C3, C4 to a given output of the matrix 181 although they arrive at the inputs of the matrix 181 in the order C2, C1, C4, C3, for example. The cell C2 is written into the second sub-queue, the cell C1 is written into the first sub-queue, the cell C4 is written into the fourth sub-queue and the cell C3 is written into the third sub-queue. The write sub-queue is chosen from the four pending sub-queues of the queue for the output concerned by the two routing bits indicating the rank of each cell. The read sub-queue is chosen periodically: first, then second, then third, then fourth, etc.

The space switching device 182 comprises:
- a combiner 191 having 16 inputs respectively connected to the 16 outputs of the buffer 181 and formed by the outputs of the 16 delay lines 189, ..., 190;
- an optical amplifier amplifying the optical signal supplied by an output of the combiner 191;
- a splitter 193 having one input connected to the amplifier 192 and 16 outputs; and
- 16 filters 194, ..., 195 each having an input connected to a respective output of the splitter 193, an electrical control input connected to an output of the interface 201 and selecting one of 16 colors and an output constituting one of the 16 outputs s1, ..., s16 of the switching matrix 180.

The combiner 191, the amplifier 192 and the splitter 193 enable all of the cells leaving the buffer 181 to be applied to the 16 filters 194, ..., 195. Each filter passes only the color selected by the electrical control signal supplied to it by the control device 52 for each cell period. They are usually controlled in such that a way that each filters a different color to route a cell from a point to a uniquely defined other point. In some cases, for example to broadcast a message simultaneously to multiple addressees, these filters can be commanded to filter the same color in a plurality of filters representing a plurality of addressees of the same cell.

What is claimed:

1. A photonic switching matrix having n inputs and n outputs for switching data in the form of fixed length cells asynchronously time-division multiplexed onto optical fibers, said photonic switching matrix comprising:
- a plurality of wavelength converters at respective inputs of the photonic switching matrix to assign a wavelength to each cell applied to an input of the photonic switching matrix;
- an optical buffer, connected to outputs of said plurality of wavelength converters, common to all the outputs of the photonic switching matrix for storing each cell for a duration selectable between 0 and $k \cdot T_c$ where K is an integer and $T_c$ is the duration of a cell;
- a space routing stage, connected to said optical buffer, comprising a filter for each output of the photonic switching matrix passing to a given output only cells having a given wavelength; and
- control means for controlling the wavelength converters and the optical buffer according to routing information indicating for each cell the output of the photonic switching matrix to which said cell is addressed and for selecting the duration for which each cell is stored in the optical buffer so as to construct a queue for each output to avoid conflicts between two cells to be switched to the same output;

wherein said optical buffer comprises:
- k+1 delay lines respectively introducing time-delays 0, ..., $K \cdot T_c$ and having outputs connected to inputs of the space routing stage;
- k+1 combiners each having n inputs and an output connected to an input of a delay line;
- n splitters each having an input constituting an input of the optical buffer and k+2 outputs; and
- (k+2)·n optical gates each connecting an output of one of the n splitters to an input of a respective one of the k+1 combiners to said control means, said optical gates being controlled by the control means so that each splitter is connected to a single combiner at a time.

2. The photonic switching matrix according to claim 1, wherein said photonic switching matrix receives cells having an original chronological order which has been modified by permutation within groups containing P cells, wherein to re-establish the original chronological order in each group containing P cells, the control means comprises means for selecting the duration for which each cell is stored in the optical buffer in such a way as to constitute P sub-queues in each queue representing an output, each cell addressed to a given output being written into one of the sub-queues of the queue for the given output on the basis of routing information indicating an initial rank of the cell in a group of P cells, cells addressed to a given output being read by reading successively a cell in each sub-queue for the given output concerned, said sub-queues being read in a predetermined order.

3. The photonic switching matrix according to claim 1 wherein to enable the same cell to be switched to more than one output, the filters are tuned independently of each other, and the control means comprises means for supplying control signals to said filters on the basis of routing information indicating for each cell the outputs of the photonic switching matrix to which said cell is addressed.

* * * * *